United States Patent
Liu et al.

(10) Patent No.: US 8,071,032 B2
(45) Date of Patent: Dec. 6, 2011

(54) SYSTEM AND METHOD FOR MANUFACTURING ORGANOPOLYSILOXANE

(75) Inventors: Tai-Kang Liu, Longtan Shiang (TW); Chi-Fa Hsieh, Zhongli (TW)

(73) Assignee: Chung-Shan Institute of Science and Technology Armaments Bureau, Ministry of National Defense, Taoyuan County (TW)

( * ) Notice: Subject to any disclaimer, the term of this patent is extended or adjusted under 35 U.S.C. 154(b) by 286 days.

(21) Appl. No.: 12/479,816

(22) Filed: Jun. 7, 2009

(65) Prior Publication Data

US 2010/0311922 A1    Dec. 9, 2010

(51) Int. Cl.
*B01J 19/00* (2006.01)
*C08F 2/01* (2006.01)

(52) U.S. Cl. ......... 422/110; 422/111; 422/131; 422/134

(58) Field of Classification Search .................. 422/110, 422/111, 131, 134

See application file for complete search history.

(56) References Cited

U.S. PATENT DOCUMENTS

| | | | |
|---|---|---|---|
| 4,652,662 A * | 3/1987 | von Au et al. | 549/215 |
| 6,214,962 B1 * | 4/2001 | Takahashi et al. | 528/21 |
| 7,759,446 B2 * | 7/2010 | Geisberger et al. | 528/10 |

* cited by examiner

*Primary Examiner* — Jennifer A Leung

(57) ABSTRACT

The invention discloses a method and a system for manufacturing organopolysiloxane. The system comprises N raw material tanks, N gauging tanks, a first reactor, a second reactor and at least one product tanks which are arranged in order from high to low. The manufacturing method comprises the following steps of: firstly, N raw materials are added into the N raw material tanks respectively. Then, a plurality of processing parameters about the organopolysiloxane are inputted to control the N gauging tanks to measure the dosage of the N raw materials according to the processing parameters, which along with a cyclic siloxane monomer are inputted into the first reactor. The first reactor is controlled to carry on ring-opening and re-distribution polymerization equilibrium reaction to the N raw materials and the cyclic siloxane monomer, so as to generate an intermediate product, and transfer the intermediate product into the second reactor. Finally, the second reactor is controlled to carry on a decomposition transient catalytic reaction to the intermediate product and a devolatilization operation to obtain the organopolysiloxane products.

10 Claims, 3 Drawing Sheets

SYSTEM AND METHOD FOR MANUFACTURING ORGANOPOLYSILOXANE

BACKGROUND OF THE INVENTION

1. Field of the Invention

The present invention relates to a method and a system for manufacturing organopolysiloxane. Particularly, the method is achieved by a quasi-continuous way through cascade equipments coordinate with automatic control. By prior established performance empirical relationship between the raw materials and the products, the computer automatic control is used to manufacture the organopolysiloxane with different viscosities and different end functional groups. The quasi-continuous processing of the invention combines with batch chemical reaction conditions, chemical equipment disposition, process control and so on to achieve the purpose of massive and flexible manufacturing of different organopolysiloxanes.

2. Description of the Prior Art

Polysiloxane is the main basic chemical structure unit of silicone fluid and silicone rubber, and the derivatives thereof can be used to make products widely applied in the national defense and different industries.

In prior art, alkali or acid catalyst is used for cyclic polysiloxane monomer to carry on a ring-opening polymerization reaction, so as to manufacture certain linear high-viscosity silicone fluids and major parts of silicone gums. The cyclic polysiloxane monomer can be represented as $(R^1R^2SiO)_n$, wherein $R^1$ and $R^2$ are univalent hydrocarbon groups with carbon numbers from 1 to 12, while n is a positive integer from 3 to 8. Particularly, D4 (octamethylcyclotetrasiloxane) (n=4) is one of the most popular cyclic polysiloxane monomer.

The aforementioned polymerization reaction usually uses the dosage of mono-functionality end-blocker, or chain stopper (M2), or the proportion of M2 and D4 to control the viscosity and the end functional group of the organopolysiloxane of the product, then the steps of eliminating catalyst and devolatilization are applied to provide polymeric product for downstream formulation applications.

In the polymerization reaction application, if the product is applied with high temperature, strong inorganic catalyst carried therein is not easy to be neutralized completely, a tiny amount of catalyst may still remain in the product, so that the stability under high temperature of the product is therefore deteriorated. Accordingly, in general, strong inorganic catalysts will not be used for high temperature applications.

Although the above-mentioned processes may differ, batch process is usually taken in the laboratory scale. Furthermore, some industrial operating processes may retain batch-wise when scale up.

According to the report of Stanford Research Institute (Scheeline, H. W and Chandwani, D. Silicones, A private report by Process Economics Program, Report no. 160, Menlo Park, Calif., p. 142-150, p. 194-195, p. 281-285, 1983), the difficulty of above-mentioned product industrialization with batch process manufacturing includes: uneven high viscosity mixing which may cause uneven product, and the difficulty of removing catalyst may cause the product to be inactive in high temperature application. Therefore, transient catalyst, which is decomposable in high temperature, such as TBPH (tetrabutylphosphonium hydroxide) or TMAH (tetramethylammonium hydroxide), is suggested to catalyze the polymerization reaction. The way of said process is to carry on the polymerization reaction by the heat exchanger type polymerizer of high length-to-diameter ratio, while the batch reaction time is substituted by the average retention time of continuous reaction in exchanger type polymerizer, and then the raw product is subjected to devolatilization process and so on. Besides Stanford Research Institute promotes the continuous type process, there are many documents with the design of continuous type process in the prior art, whose differences are concentrated in the processing equipment, and discussion of unnecessary details will be hereby omitted.

Development of any chemical synthesis product may start with batch operation during the initial research period. Depends on market demand and degree of the process's complexity, either batch-type design or continuous-type design may be chosen for scale up operation. Traditionally, batch-type scale up is easier and relatively cheaper, especially for the production of organopolysiloxane. Because the polymerization reaction of organopolysiloxane has the characteristics of insignificant exothermic heat of reaction and long reaction time, it is even easier to use the batch-type scale up directly. However its shortcoming is small yield and high manpower for specific yield.

Yet it is not straightforward to design continuous-type reactor by using batch laboratory reaction data. The traditional rule is to obtain the chemical kinetic models (the empirical model or the mechanistic model) first, and then bring mass balance model and flow field model of different-type continuous reactors to carry on a series of study routes, such as simulation yield calculation, bench scale and pilot scale facilities erection and testing, software and hardware revision, etc. to verify the accuracy of the design, and finally build a full chemical plant, and after successful test runs to obtain products of mass manufacture continuously. This scale up strategy must invest many research and development resources in the design stage, especially needs to purchase many control instruments to maintain continuous operation. The investment expenditure is much higher than the one of the batch process. In addition, the continuous-type process will cause the loss of the raw material during process shutdown or startup. Moreover, the continuous-type process lacks manufacturing flexibility in accordance to moderate demand for each different specification products, and therefore is not favorable for the manufacture and sale strategy of the small to medium enterprises.

SUMMARY OF THE INVENTION

Accordingly, an aspect of the present invention is to provide a method for manufacturing organopolysiloxane, applied to a manufacturing system. The manufacturing system comprises N raw material tanks, N gauging tanks, a first reactor, a second reactor and at least one product tanks which are arranged in order from high to low, wherein N is a positive integer.

According to an embodiment, the manufacturing method of the organopolysiloxane comprises the following steps of: firstly, adding N raw materials into the N raw material tanks respectively; inputting a plurality of processing parameters about the organopolysiloxane; controlling the N gauging tanks to measure the dosage of the N raw materials according to the processing parameters, and adding the measured N raw materials along with a cyclic siloxane monomer into the first reactor.

Furthermore, controlling the first reactor to carry on ring-opening and re-distribution polymerization equilibrium reaction to the N raw materials and the cyclic siloxane monomer, so as to generate an intermediate product, and transferring the intermediate product into the second reactor. Finally, controlling the second reactor to carry on a decomposition transient catalytic reaction to the intermediate product and a devolatilization operation to obtain the organopolysiloxane, and storing the organopolysiloxane in the product tank. When any tank or reactor carries on one said step, its adjacent upstream tank or reactor carries on the related preparation step. The cyclic siloxane monomer has a structure of formula (I):

(I)

wherein $R^1$ and $R^2$ are univalent hydrocarbon groups with carbon numbers from 1 to 12, while n is a positive integer from 3 to 8.

Another aspect of the present invention is to provide a system for manufacturing organopolysiloxane. The system comprises N raw material tanks, N gauging tanks, a first reactor, a second reactor, a controlling apparatus and at least one product tanks. According to an embodiment, the N raw material tanks are used for storing the N raw materials respectively, wherein N is a positive integer. The N gauging tanks are connected to the N raw material tanks respectively. The first reactor is connected to the N gauging tanks, while the second reactor is connected to the first reactor.

Furthermore, the controlling apparatus, respectively connected to the N gauging tanks, the first reactor and the second reactor, is used for controlling the N gauging tanks to measure the dosage of the N raw materials according to a plurality of processing parameters about the organopolysiloxane, and the measured N raw materials along with a cyclic siloxane monomer are inputted into the first reactor. The first reactor is controlled to carry on ring-opening and re-distribution polymerization equilibrium reaction to the N raw materials and the cyclic siloxane monomer, so as to generate an intermediate product, and transfer the intermediate product into the second reactor. The second reactor is controlled to carry on a decomposition transient catalytic reaction to the intermediate product and a devolatilization operation to obtain the organopolysiloxane.

Furthermore, the product tanks are used for storing the organopolysiloxane. The N raw material tanks, the N gauging tanks, the first reactor, the second reactor and the product tanks are arranged in order from high to low, so that the N raw materials, the cyclic siloxane monomer, the intermediate product and the organopolysiloxane are capable of being transferred from high to low due to the gravity effect.

The cyclic siloxane monomer has a structure of formula (I):

(I)

wherein $R^1$ and $R^2$ are univalent hydrocarbon groups with carbon numbers from 1 to 12, while n is a positive integer from 3 to 8.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

The invention discloses a method for manufacturing organopolysiloxane, especially to a method for flexible manufacturing organopolysiloxane. Particularly, the method is achieved by a quasi-continuous way through cascade equipments coordinate with automatic controlling. Particularly, by prior established performance empirical relationship between the raw materials and the product (such as viscosity, molecular weight), the method uses a computer automatic process control to manufacture the organopolysiloxane, wherein the organopolysiloxane comprises homopolymers or copolymers with different viscosities and different end functional groups. Furthermore, the end functional groups comprise one selected from the group consisting of vinyl-terminated functional group, aminopropyl-terminated functional group or methyl-terminated group.

In an embodiment, the manufacturing method of the organopolysiloxane of the invention is applied to a manufacturing system. The manufacturing system comprises N raw material tanks, N gauging tanks, a first reactor, a second reactor and at least one product tanks which are arranged in order from high to low, wherein N is a positive integer.

Figure 1:
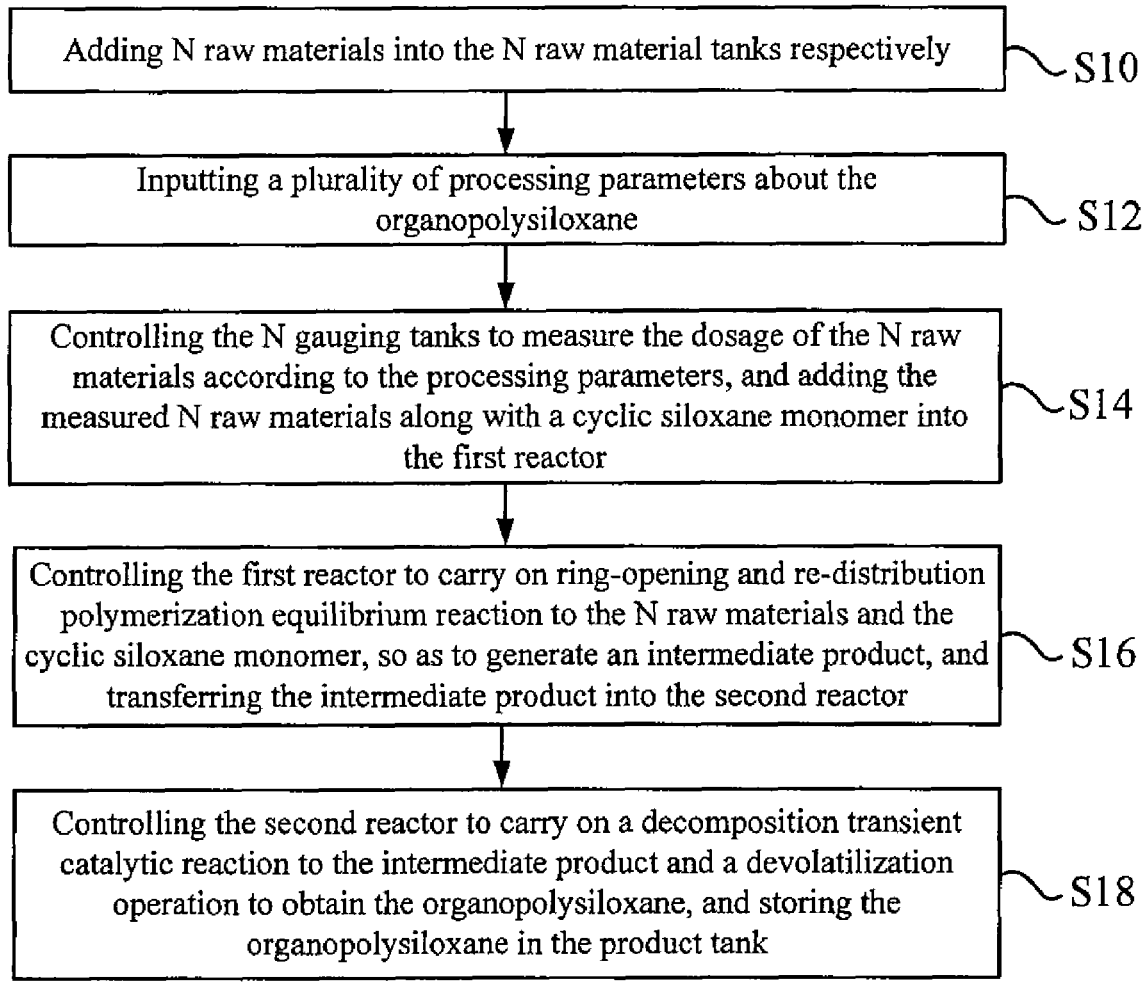
FIG. 1 is a flow chart illustrating a method for manufacturing organopolysiloxane according to an embodiment of the invention.

Please refer to FIG. 1. FIG. 1 is a flow chart illustrating the manufacturing method of the organopolysiloxane according to an embodiment of the invention. As shown in the figure, the manufacturing method comprises the following steps of: step S10, adding N raw materials into the N raw material tanks respectively; step S12, inputting a plurality of processing parameters about the organopolysiloxane; step S14, controlling the N gauging tanks to measure the dosage of the N raw materials according to the processing parameters, and adding the measured N raw materials along with a cyclic siloxane monomer into the first reactor; step S16, controlling the first reactor to carry on ring-opening and re-distribution polymerization equilibrium reaction to the N raw materials and the cyclic siloxane monomer, so as to generate an intermediate product, and transferring the intermediate product into the second reactor; step S18, controlling the second reactor to carry on a decomposition transient catalytic reaction to the intermediate product and a devolatilization operation to obtain the organopolysiloxane, and storing the organopolysiloxane in the product tank. The cyclic siloxane monomer has a structure of formula (I):

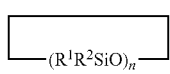
(I)

wherein $R^1$ and $R^2$ are univalent hydrocarbon groups with carbon numbers from 1 to 12, while n is a positive integer from 3 to 8. In practice, whenever any tank or reactor carries on one said step, the adjacent upstream tank or reactor simultaneously carries on the related preparation step.

The manufacturing method of the organopolysiloxane of the invention can combine with technologies such as batch chemical reaction formula and conditions, industrial chemical reactor design and disposition, computer programmable control and so on, to achieve the purpose of flexible manufacturing the organopolysiloxane. Compared with the batch or the continuous processing in the prior art, the quasi-continuous processing of the invention has the following advantages:

1. Easy scale up of the research results: the chemical formula and the processing conditions can be obtained from batch laboratory and be applied directly to similar large-scale reactors to avoid complex continuous processing and associated high-expenditure R&D investment.

2. Flexible production strategy: sequential process computer control combined with prior established performance empirical relationship between the raw materials and the product performance (for example, viscosity and molecular weight) can be used to set product specification to carry on automatic production so as to flexibly produce specific products to meet market requirements.

The quasi-continuous manufacturing method of the organopolysiloxane of the invention is basically an automation batch process. Additional equipments should be implemented to comply with the synthesis requirement. For example, after the raw materials are added into chemical reactors simultaneously or in turn, the reactor carries on heating or cooling operations under agitation to control the needed temperature. In addition, the reactor may also carry on the operations of noble gas protection, vacuuming, refluxing, etc. to meet producing requirements.

The polymerization reaction of the organopolysiloxane of the invention needs related raw materials such as D4 (octamethylcyclotetrasiloxane), a catalyst, an end-blocker, V4 (1,3,5,7-tetravinyl-1,3,5,7-tetramethylcyclotetrasiloxane) and so on. If the ultimate objective product is restricted in high temperature and high strength formulation application, a transient catalyst will be selected to carry on the polymerization reaction, and the processing operation comprises three steps of ring-opening and re-distribution polymerization equilibrium reaction, decomposition transient catalyst reaction and removing low molecular weight products by devolatilization operation, wherein said three steps have different operating temperatures and operating time.

Said V4 is capable of being carried on ring-opening copolymerization with D4 to provide a polysiloxane having side vinyl group for formulation application, and the viscosity of said product can be controlled by the dosage of the end-blocker.

Another aspect of the present invention is to provide a system for manufacturing organopolysiloxane. The system comprises N raw material tanks, N gauging tanks, a first reactor, a second reactor, a controlling apparatus and at least one product tanks. According to an embodiment, the N raw material tanks are used for storing the N raw materials respectively, wherein N is a positive integer. The N gauging tanks are connected to the N raw material tanks respectively. The first reactor is connected to the N gauging tanks, while the second reactor is connected to the first reactor.

Furthermore, the controlling apparatus, respectively connected to the N gauging tanks, the first reactor and the second reactor, is used for controlling the N gauging tanks to measure the dosage of the N raw materials according to a plurality of processing parameters about the organopolysiloxane, and the measured N raw materials along with a cyclic siloxane monomer are inputted into the first reactor. The first reactor is controlled to carry on ring-opening and re-distribution polymerization equilibrium reaction to the N raw materials and the cyclic siloxane monomer, so as to generate an intermediate product which is transferred into the second reactor. The second reactor is controlled to carry on a decomposition transient catalytic reaction to the intermediate product, and further carry on a devolatilization operation to obtain the organopolysiloxane.

Furthermore, the product tanks are used for storing the organopolysiloxane. The N raw material tanks, the N gauging tanks, the first reactor, the second reactor and the product tanks are arranged in order from high to low, so that the N raw materials, the cyclic siloxane monomer, the intermediate product and the organopolysiloxane are capable of being transferred from high to low due to the gravity effect.

The cyclic siloxane monomer has a structure of formula (I):

(I)

wherein $R^1$ and $R^2$ are univalent hydrocarbon groups with carbon numbers from 1 to 12, while n is a positive integer from 3 to 8.

Figure 2:
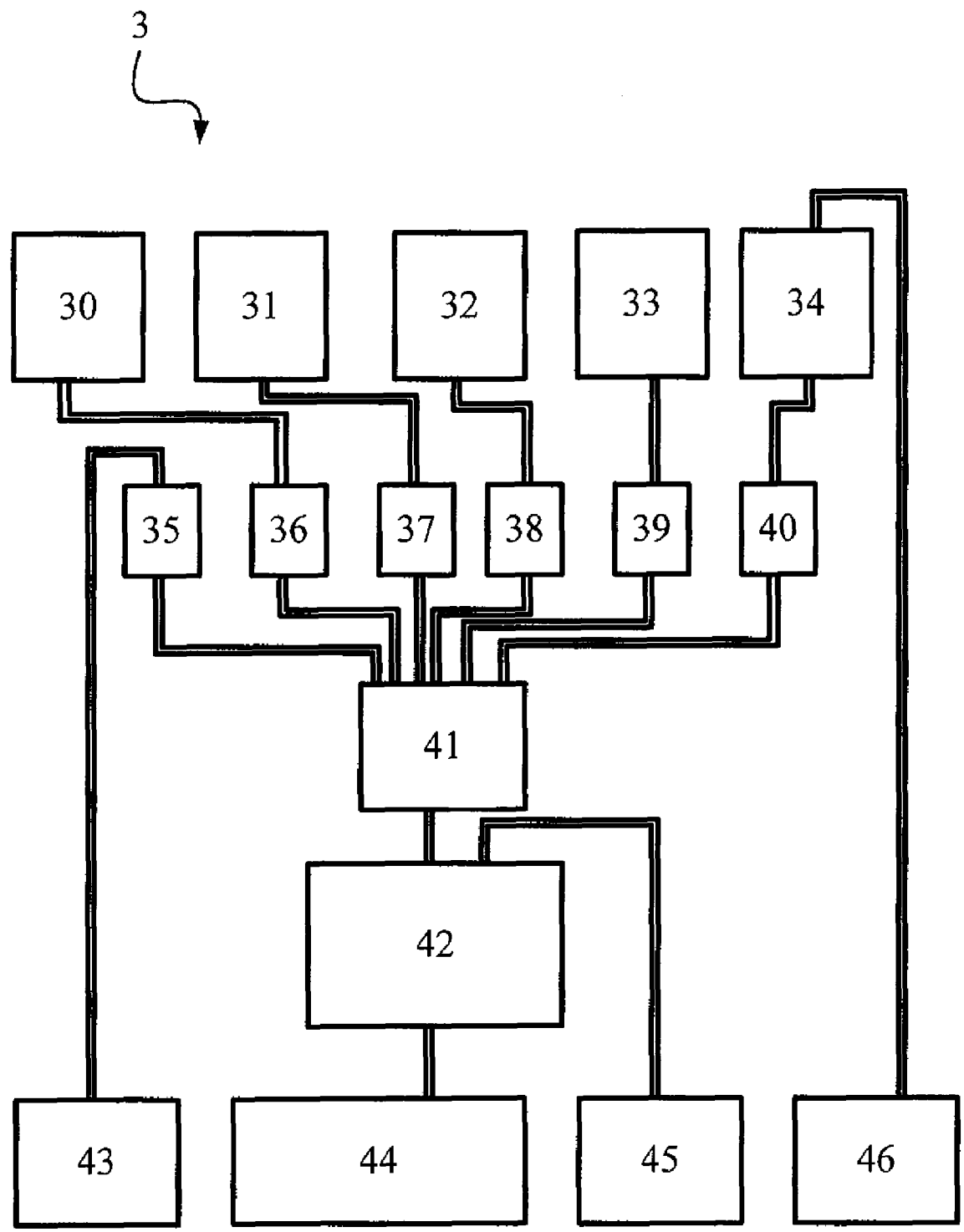
FIG. 2 is a schematic diagram illustrating a system for manufacturing organopolysiloxane according to an embodiment of the invention.

Please refer to FIG. 2. FIG. 2 is a schematic diagram illustrating a manufacturing system 3 of the organopolysiloxane according to an embodiment of the invention. As shown, FIG. 2 is an equipment flow chart of equipments disposed at five different levels. From top to bottom, the raw material tanks are disposed at the first level, which comprise vinyl end-blocker tank 30, aminopropyl end-blocker tank 31, no functional group end-blocker tank 32, catalyst tank 33 and V4 (1,3,5,7-tetravinyl-1,3,5,7-tetramethylcyclotetrasiloxane) tank 34. However, in this embodiment, D4 tank is not disposed at the first level.

The gauging tanks are disposed at the second level, which comprise D4 (octamethylcyclotetrasiloxane) gauging tank 35, vinyl end-blocker gauging tank 36, aminopropyl end-blocker gauging tank 37, no functional group end-blocker gauging tank 38, catalyst gauging tank 39 and V4 (1,3,5,7-tetravinyl-1,3,5,7-tetramethylcyclotetrasiloxane) gauging tank 40.

The first reactor 41 is disposed at the third level, while the second reactor (concurring first devolatilization tank) 42 is disposed at the fourth level. Furthermore, the raw material D4 storage tank 43, organopolysiloxane product temporary storage tank 44, a storage tank 45 of volatiles extracted from the second reactor 42, and V4 storage tank 46 are disposed at the fifth level.

In the embodiment, each batch reaction quantity of D4 is pumped to the D4 gauging tank 35 at the second level via a pump, while V4 is transferred to the raw material tank 34 at the first level via a pump. The purpose of the gauging tanks at the second level is to measure the raw material of every batch quantity, so as to transfer the measured quantity to the first reactor 41 to carry on the reaction. In practice, the dosage of other raw materials is far less than that of D4. Therefore, when the raw materials are measured by the gauging tanks of the second layer, the dosage of D4 is measured by its liquid level, while the dosages of other raw materials are measured by their weight to achieve product specification accuracy. If the weight measurement accuracy and reliability are high enough, it may be considered to abbreviate some tanks at the second level, and the raw materials from the raw material tanks at the first level are directly injected into the first reactor 41. In addition, besides the volatile liquid from the second reactor 42 to the volatile tank 45 is extracted out and transferred by vacuum cooling, the transferring of all liquids from top to bottom is achieved by their gravities.

The catalyst of the invention is a transient type catalyst. TMAH or TBPH can be transformed into related silanonate via the known processing. TMAH has advantage of high reaction rate, but it will decompose to produce trimethylamine with fishy smell which needs long time to be removed, while TBPH has no such problem. Because of the difference between the viscosities and dosages of the raw materials, a part of D4 for a given product specification can be injected into the reactor 41 first, then other raw materials with small dosage and high viscosity can be injected, and finally the remaining D4 is injected, so as to increase the mixing uniformity of the raw materials. These steps can be achieved via a processing computer control program and control valves. The reactor 41 carries on ring-opening and re-distribution polymerization equilibrium reaction, wherein the stirred reaction time is about 3-5 hours and the reaction temperature is about 60-100° C. During the period of reaction, the gauging tanks (35, 36, 37, 38, 39, and 40) can carry on feeding measurement for the next batch application. The measurement quantity depends on product's specification, which may be the same as the quantity of the last batch, or may be different, and may be established in advance via the computer. Reactor 41 can be kept under non-moisture condition such that not affecting the polymerization reaction. Dry inert gas such as $N_2$ or Ar is allowed to slightly flow onto the reactor surface such that the reactor keeps positive pressure slightly. In order to ensure the raw material monomer not been lost during the polymerization reaction, a cooling reflux installment may be installed above the reactor 41. After the reaction temperature and time are attended, the reaction liquid flows into the secondary reaction 42 by its gravity.

The second reactor 42 carries on the reaction of decomposing transient catalyst first, and then carries on the devolatilization operation. The agitation reaction time of the former is about 1-2 hours, and the reaction temperature is about 120-180° C. The agitation reaction time of the latter is about 1-2 hours, and the operation temperature is about 160-220° C. It needs reducing pressure for the devolatilization operation. The extract must be collected by a condenser for providing to a repolymerization reaction, which is saved in the volatiles tank 45.

Furthermore, the second reactor 42 carries on a secondary pressure-reducing operation which is not a chemical reaction but purely is a mass transfer operation. In the beginning, the low molecular weight product density in the reactor is high, it will cause the reactor surface to produce forming phenomenon if high temperature and vacuum are exercised. The foam height is different according to the vacuum rate; therefore the volume of the reactor 42 should be bigger than the one of the reactor 41 to overcome the temporary forming phenomenon. After above two stage operations are finished, the primary product is stored in the temporary storage tank 44 while the reactor 42 receives next batch liquid of the first reactor 41 which already finished the ring-opening and re-distribution polymerization equilibrium reaction.

The above-mentioned secondary pressure-reducing operation of the second reactor 42 is limited to the insufficiency of mass transfer area per unit volume of the batch reactor. Moreover, the whole system needs to maintain continuous working. Therefore, it is unable to completely remove the low molecular weight volatiles (especially from the high viscosity organopolysiloxane products) during a limited period allowed in the system. The primary product needs other processes to further remove the low molecular weight volatiles by other equipments, such as disclosed in our previous design (US 2008/0255338 A1, Design Method of Batch Falling Strand Devolatilizer, Oct. 16, 2008), while the discussion of unnecessary details will be hereby omitted.

Figure 3:
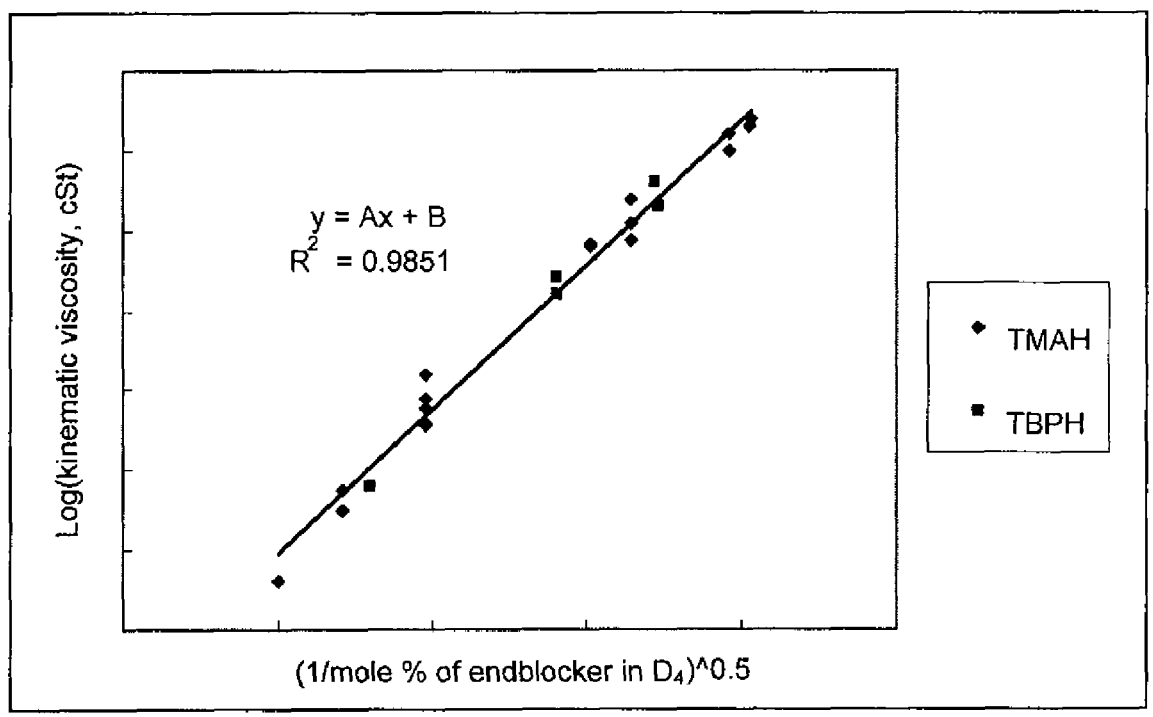
FIG. 3 is a schematic diagram illustrating the effect of dosage of the end-blocker on viscosity of vinyl-terminated polysiloxane, aminopropyl-terminated polysiloxane, and other related polysiloxane products of the invention.

Please refer to FIG. 3. FIG. 3 is a schematic diagram illustrating the effect of dosage of the end-blocker on the homopolymerization or copolymerization viscosity of vinyl-terminated polysiloxane, aminopropyl-terminated polysiloxane and D4/V4 copolymer of the invention. This invention demonstrates that no matter taking TBPH or TMAH silanolate as the catalyst, the relationship between the dosage of the end-blocker and the product's viscosity is shown in FIG. 3, that there is a linear relationship between $[1/(100×\text{moles of the end-blocker/moles of D4})]^{0.5}$ and log(product's kinematic viscosity), i.e. the more dosage of the end-blocker is added, the lower viscosity of the product is achieved. The kinematic viscosity comes from the viscosity dividing the density of the polysiloxane product.

When the kinematic viscosity of FIG. 3 is substituted by the viscosity, approximate result will be obtained expectably. When the end-blocker is DVTMDS (1,3-divinyltetramethyldisiloxane), $R^2$ of FIG. 3's empirical linear equation is larger than 0.98, and the viscosity range is about $10^3$ times. When the end-blocker is APTMDS (1,3-bis(aminopropyl)tetramethyldisiloxane), $R^2$ of FIG. 3's empirical linear equation is larger than 0.95, and the viscosity range is about $10^2$ times. The intercept and slope of the above-mentioned linear empirical equation are different with the types of the end-blocker and the reaction raw materials.

The invention needs to manufacture the products with same functional group but different viscosity in the same reactor. In order to save time for mass production, it does not plan to clean the reactor between batches. Whether the action will affect the product performance is illustrated in the following embodiments.

Experiment A: 2 kilogram D4, 10.9 gram DVTMDS and 7.5 gram silanolate are charged into a 5 liter clean reactor which is agitated for 4 hours at 80° C. under nitrogen, heating-up to 150° C. and stirs for 1.5 hours, and further heating-up to 185° C. in vacuum (20 torr) and stirs for another 1.5 hours. The primary product then circulates 2 times for eliminating low molecular weight products via a 10 liters batch falling strand devolatilizer in 20-34 torr under 190° C. wall temperature. After cooling to room temperature, the product's viscosity is larger than 3000 cP, the volatile content is 1.91%, molecular weight Mw is larger than 80000, Mw/Mn=1.7, and yield is 85.4%. The viscosity is measured by Brooklield DV-I+ viscometer under room temperature. When the viscosity is in the range of 1,000 cp, S18 revolving pin is used at a rotational speed of 1.5~2 rpm. When the viscosity is in the range of 100,000 cp, S25 revolving pin is used at a rotational speed of 5~6 rpm. The volatile content is measured by Mettler HR73 Halogen Moisture Analyzer to choose 5 gram sample and to measure its weight loss after heating 150° C. for 3 hours. The molecular weight is measured with GPC calibrated by polystyrene, while the yield is calculated by D4 as the base.

Experiment B: Repeat experiment A without cleaning the reactor. Under the same formula and the processing, the product viscosity is larger than 4000 cP, the volatile content is 0.74%, molecular weight Mw is larger than 80000, Mw/Mn=1.63, and the yield is 83.2%.

Experiment C: 2 kilogram D4, 3.9 gram DVTMDS and 7.4 gram silanolate are charged into a 5 liter clean reactor which is agitated for 4 hours at 80° C. under nitrogen, heating-up to 150° C. and stirs for 1.5 hours, and further heating-up to 185-190° C. in vacuum (20 torr) and stirs for another 1.5 hours. The primary product circulates 1 times for eliminating low molecular weight products via a 10 liters batch falling strand devolatilizer in 18 torr under 190° C. wall temperature. After cooling to room temperature, the product's viscosity is larger than 5000 cP, the volatile content is 3.25%, molecular weight Mw is larger than 170000, Mw/Mn=1.66, and yield is 82.4%.

Experiment D: Repeat experiment C without cleaning the reactor. Under the same formula and the processing, the product viscosity is larger than 60000 cP, the volatile content is 2.2%, molecular weight Mw is larger than 160000, Mw/Mn=1.58, and the yield is 81.6%.

Experiment E: 2 kilogram D4, 51.2 gram DVTMDS and 7.4 gram silanolate are charged into the reactor after experiment D without further cleaning. Agitated reaction for 4 hours at 80° C. under nitrogen, heating-up to 150° C. and stirs for 1.5 hours, and further heating-up to 185-190° C. in vacuum (20 torr) and stirs for another 1.5 hours. The primary product circulates 1 times for eliminating low molecular weight products via a 10 liters batch falling strand devolatilizer in 20 torr under 190° C. wall temperature. After cooling to room temperature, the product's viscosity is larger than 200 cP, the volatile content is 1.2%, molecular weight Mw is larger than 20000, Mw/Mn=2.31, and yield is 81.8%.

Experiment F: Cleaning the reactor after experiment E, and then carry on the experiment with the same formula and the processing as Experiment E. The product viscosity is larger than 150 cP, the volatile content is 1.52%, molecular weight Mw is larger than 20000, Mw/Mn=2.33, and the yield is 83.4%.

In another embodiment, Table 1 is the result by using a commercial PLC (Programmable Logic Controller), a 5-liter bench scale first reactor, a 10-liter second reactor, raw materials tanks, gauging tanks, and product tanks, as depicted in FIG. 1 and FIG. 2, for test manufacturing both vinyl-terminated polydimethylsiloxane and aminopropyl-terminated polydimethylsiloxane each with different viscosities. During the manufacturing period, FIG. 3 is used for carrying on the product specification control and raw material dosage control for different products under 24-hour operation. When producing the products with same functional group, the reactors are not cleaned between the batches. When producing the products with different functional groups, the inner wall of the reactor is quickly cleaned by either D4 or the recycled low molecular weight volatiles from tank 45.

TABLE 1 different organopolysiloxanes manufactured by quasi-continuous process

| | Quasi-continuous batch number | | | | |
|---|---|---|---|---|---|
| | 1 | 2 | 3 | 4 | 5 |
| Goal product | Vinyl-terminated polydimethylsiloxane | Vinyl-terminated polydimethylsiloxane | Vinyl-terminated polydimethylsiloxane | Vinyl-terminated polydimethylsiloxane | Vinyl-terminated polydimethylsiloxane |
| Goal viscosity cp | 1200 | 1200 | 1200 | 140000 | 140000 |
| Product viscosity cp | 1207 | 1257 | 1168 | 142700 | 145800 |
| Yield % | 82.7 | 83.2 | 82.9 | 84.5 | 82.6 |

| | Quasi-continuous batch number | | | |
|---|---|---|---|---|
| | 6 | 7 | 8 | 9 |
| Goal product | Vinyl-terminated polydimethylsiloxane | Vinyl-terminated polydimethylsiloxane | Vinyl-terminated polydimethylsiloxane | Vinyl-terminated polydimethylsiloxane |
| Goal viscosity cp | 140000 | 15000 | 15000 | 15000 |
| Product viscosity cp | 146980 | 15450 | 14410 | 16280 |
| Yield % | 84.8 | 85.1 | 84.5 | 83.2 |

| | Quasi-continuous batch number | | | | |
|---|---|---|---|---|---|
| | 10 | 11 | 12 | 13 | 14 |
| Goal product | Vinyl-terminated polydimethylsiloxane | Vinyl-terminated polydimethylsiloxane | Aminopropyl-terminated polydimethylsiloxane | Aminopropyl-terminated polydimethylsiloxane | Aminopropyl-terminated polydimethylsiloxane |
| Goal viscosity cp | 15000 | 15000 | 110 | 110 | 2000 |
| Product viscosity cp | 16520 | 14760 | 128 | 119 | 1940 |
| Yield % | 84.6 | 85.2 | 83.5 | 85.2 | 84.6 |

TABLE 1-continued different organopolysiloxanes manufactured by quasi-continuous process

| | | Quasi-continuous batch number | | | |
|---|---|---|---|---|---|
| | | 15 | 16 | 17 | 18 |
| | Goal product | Aminopropyl-terminated polydimethylsiloxane | Aminopropyl-terminated polydimethylsiloxane | Vinyl-terminated polydimethylsiloxane | Vinyl-terminated polydimethylsiloxane |
| | Goal viscosity cp | 2000 | 2000 | 6000 | 6000 |
| | Product viscosity cp | 2280 | 2170 | 6120 | 6450 |
| | Yield % | 84.8 | 83.5 | 83.7 | 84.2 |

To sum up, the manufacturing method of the organopolysiloxane of the invention is applied in a manufacturing system. The manufacturing system comprises N raw material tanks, N gauging tanks, a first reactor, a second reactor and at least one product tanks which are arranged in order from high to low. Particularly, the method is achieved by a quasi-continuous way through cascade equipments coordinate with automatic control. More particularly, by prior established performance empirical relationship between the raw materials and the product (such as viscosity, molecular weight), the method uses a sequential computer process controller to manufacture the organopolysiloxanes with different viscosities and different end functional groups.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A system for manufacturing organopolysiloxane, comprising:

N raw material tanks, for respectively storing one of the N raw materials, N being a positive integer;

N gauging tanks connected to the N raw material tanks;

a first reactor connected to the N gauging tanks;

a second reactor connected to the first reactor;

a controlling apparatus, connected to the N gauging tanks, the first reactor and the second reactor respectively, for controlling the N gauging tanks to measure the dosage of the N raw materials according to a plurality of processing parameters about the organopolysiloxane, and the measured N raw materials along with a cyclic siloxane monomer being inputted into the first reactor; the first reactor being controlled to carry on ring-opening and re-distribution polymerization equilibrium reaction to the N raw materials and the cyclic siloxane monomer, so as to generate an intermediate product which is transferred into the second reactor; the second reactor being controlled to carry on a decomposition transient catalytic reaction to the intermediate product, and further carry on a devolatilization operation to obtain the organopolysiloxane; and at least one product tanks for storing the organopolysiloxane;

wherein the N raw material tanks, the N gauging tanks, the first reactor, the second reactor and the product tanks are arranged in order from high to low, so that the N raw materials, the cyclic siloxane monomer, the intermediate product and the organopolysiloxane are capable of being transferred from high to low due to the gravity effect;

wherein the cyclic siloxane monomer has a structure of formula (I):

(I)

wherein $R^1$ and $R^2$ are univalent hydrocarbon groups with carbon numbers from 1 to 12, n being a positive integer from 3 to 8.

2. The manufacturing system of claim 1, wherein the organopolysiloxane comprises homopolymers or copolymers with different viscosities and different end functional groups.

3. The manufacturing system of claim 2, wherein the end functional groups comprise one selected from the group consisting of: vinyl-terminated functional group, aminopropyl-terminated functional group and methyl-terminated group.

4. The manufacturing system of claim 1, wherein n is equal to 4, and both $R^1$ and $R^2$ are methyl or one of them is vinyl.

5. The manufacturing system of claim 1, wherein the N raw materials comprise a thermal decomposable polymerization catalyst, an end-blocker and a vinyl cyclic.

6. The manufacturing system of claim 5, wherein the thermal decomposable polymerization catalyst is organopolysiloxane with ammonium group or phosphorous group.

7. The manufacturing system of claim 5, wherein the end-blocker is one selected from the group consisting of: hexamethyldisiloxane, divinyltetramethyldisiloxane, aminopropyltetramethyldisiloxane, aminopropyl siloxane terminated oligomer and linear siloxane oligomer end-capped with tri-organo silane group.

8. The manufacturing system of claim 1, wherein the dosage of the cyclic siloxane monomer is controlled by its liquid level, while the dosages of the N raw materials are controlled by their weight.

9. The manufacturing system of claim 1, wherein the processing parameters comprise raw material selection parameter, raw material gauging parameter, raw material retention-time parameter, processing temperature parameter, mixing time parameter and product viscosity parameter.

10. The manufacturing system of claim 9, wherein the N raw materials comprise an end-blocker, and the raw material selection parameter and the raw material gauging parameter being decided according to a linear relationship of (moles of the end-blocker/moles of the cyclic siloxane monomer)$^{0.5}$ and log(product's kinematic viscosity), or according to a linear relationship of (moles of the end-blocker/moles of the cyclic siloxane monomer)$^{0.5}$ and log(product's viscosity).

* * * * *